United States Patent Office 3,159,497
Patented Dec. 1, 1964

3,159,497
METHOD OF IMPROVING THE GRADE OF BY-PRODUCT GYPSUM OBTAINED IN CARRYING OUT A WET PROCESS FOR PRODUCTION OF PHOSPHORIC ACID
Taro Yamaguchi, Onoda, Japan, assignor to Onoda Cement Company Limited, Onoda, Japan, a corporation of Japan
No Drawing. Filed Oct. 2, 1961, Ser. No. 142,003
Claims priority, application Japan, Oct. 25, 1960, 35/42,352, 35/42,353
10 Claims. (Cl. 106—89)

This invention relates to a method of improving the grade of by-product gypsum obtained in carrying out a wet process for production of phosphoric acid from phosphate rocks by converting the gypsum into a dihydrated gypsum suitable for use as an inhibitor for the cement setting.

An object of this invention is to provide an economical method for production of the dihydrated gypsum containing water soluble phosphoric acid in trace and having the property which is identical with or even superior to that of natural gypsum in its inhibiting action when said dihydrated gypsum is used as the inhibitor for the cement setting.

It is well known that by-product gypsum is obtained by the wet process for manufacturing phosphoric acid from the phosphate rocks. Such by-product gypsum, however, can not be used directly as a raw material in the manufacture of cement. The reason for this is considered to be that water soluble phosphoric acid contained in the by-product gypsum retards the cement setting and deteriorates the mechanical strength of cement.

In order to eliminate such drawbacks, there have heretofore been proposed the following methods:

(1) A method of completely washing the by-product gypsum with water;
(2) A method of washing the by-product gypsum with a milky solution of lime;
(3) A method of mixing the by-product gypsum with calcium hydroxide and water.

The by-product gypsum treated by such methods as mentioned above tends to reduce the mechanical strength of cement, particularly the mechanical strength of cement in a short period of time, and remarkably degrades the quality of cement when it is used as an inhibitor for the cement setting. Therefore, it was found that the above mentioned methods were not satisfied.

In this connection, the inventor has conducted various experiments and discovered that not only water soluble phosphoric acid contained in said by-product gypsum, but also phosphoric acid contained therein in the state of solid solution cause the disadvantageous effects and functions to the development of the mechanical strength and the setting of cement.

In order to eliminate such drawbacks, the inventor previously provided a method which relates to the production of dihydrated gypsum by calcining said by-product gypsum so as to form half-hydrated gypsum and/or soluble anhydrous gypsum, and subjecting the resulting product to hydration in the presence of calcium oxide, calcium hydroxide or magnesium oxide or the like.

The inventor, however, has found that the grade of such dihydrate gypsum thus produced was still inferior to that of natural gypsum. In order to clarify reasons for which such disadvantageous results are caused, the inventor has conducted some experiments as will be described hereinafter.

An air dried by-product gypsum (results of its chemical analysis are shown in Table I) was converted into half-hydrated gypsum and/or soluble anhydrous gypsum by calcining it at a temperature of 120° C. for a period of 1.5 hours and then, 100 parts by weight of the resulting product was subjected to hydration into dihydrated gypsum in a medium (pulp density is about 14%) comprising 35 parts by weight of a milk of lime. In such hydration, the dihydrated gypsum is allowed to stand in the medium for various periods of time. And then, the dihydrated gypsum thus obtained is mixed with cement and its action is tested by measuring the setting time of cement.

Table II gives the results of the setting tests conducted in the same manner with the finely divided cements which are prepared by crushing either a mixture of 3% by weight of the dihydrated gypsum treated in the medium for one day, four days and ten days respectively as mentioned above with Portland cement clinker or a mixture of 3% by weight of natural gypsum (results of its chemical analysis are shown in Table III) with Portland cement clinker in the same condition.

Table I

| Ingredient | CaO, percent | SO₃, percent | Total P₂O₅, percent | Water soluble P₂O₅, percent | Fluorine, percent |
|---|---|---|---|---|---|
| By-product gypsum | 31.44 | 43.46 | 0.92 | 0.81 | 0.75 |

Table II

| Gypsum used | Water content, percent | Cement tested ||||||
|---|---|---|---|---|---|---|
| | | SO₃, percent | Specific surface area, cm.²/g. | Initial setting time in minutes | Final setting time in minutes | Consistency in mm. |
| Natural gypsum | 25 | 1.6 | 3,250 | 190 | 260 | 30 |
| Dihydrated gypsum, allowed to stand for one day in the medium | 25 | 1.6 | 3,200 | 220 | 285 | 34 |
| Dihydrated gypsum, allowed to stand for four days in the medium | 25 | 1.6 | 3,300 | 215 | 275 | 30 |
| Dihydrated gypsum, allowed to stand for ten days in the medium | 25 | 1.6 | 3,250 | 200 | 260 | 32 |

Table III

| Ingredient | Ignition loss, percent | Insoluble residue, percent | CaO, percent | SO₃, percent | Total P₂O₅, percent | Water soluble P₂O₅, percent | Fluorine, percent |
|---|---|---|---|---|---|---|---|
| Natural gypsum | 22.76 | 5.60 | 27.90 | 34.05 | 0 | 0 | 0 |

It is understood from the Table II that the setting time of Portland cement containing the dihydrated gypsum which is produced by treating the calcined by-product gypsum for a long period of time, for example ten days, in the medium comprising the milk of lime is approximately equal to that of Portland cement containing natural gypsum.

As to the reasons for which such results are obtained, the inventor considers as follows:

Generally, such by-product gypsum contains phosphoric acid of free state in various amounts and hence it is acidic. When such by-product gypsum is calcined, therefore, the free state phosphoric acid is converted into calcium pyrophosphate or calcium metaphosphate or the like. Since said calcium phosphates are dissolved in water very slowly, it is considered that they cannot be completely, readily converted into inert calcium triphosphates by reacting with calcium hydroxide when they are subjected to hydration in the medium comprising the milk of lime thereby to form the dihydrated gypsum. Thus, said calcium pyrophosphate or calcium metaphosphate is retained in the dihydrated gypsum unless calcined by-product gypsum is allow to stand for a long period of time in the medium comprising the milk of lime. Therefore, the inventor considers that the setting time of cement containing the dihydrated gypsum obtained by treating calcined by-product gypsum in the medium comprising the milk of lime for a short period of time is retarded by the action of the retained calcium pyrophosphate or calcium metaphosphate.

This invention provides a method of eliminating such disadvantages as mentioned above which could not heretofore been overcome by the prior art.

This invention relates to a method of improving the grade of by-product gypsum obtained in the wet process of manufacturing phosphoric acid from phosphate rocks, which comprises the steps of forming a mixture of said by-product gypsum and at least one additive substance selected from the group consisting of calcium oxide, calcium hydroxide, calcium carbonate, magnesium hydroxide, magnesium carbonate, powder produced from Portland cement clinker, Portland cement, flue dust produced from cement kiln, pulverized slag produced from blast furnace, iron hydroxide, iron oxide, aluminium hydroxide and aluminium oxide and the like; subjecting said mixture to heating at a suitable temperature thereby to form at least one substance selected from the group consisting of half-hydrated gypsum, soluble anhydrous gypsum and a mixture thereof; and subjecting said substance thus obtained to hydration either in the presence of water or a water slurry containing at least one of said additive substances thereby to form dihydrated gypsum.

The method of this invention will be fully understood in the light of the following description.

In accordance with this invention, water soluble phosphoric acid contained in said by-product gypsum can be converted into an inert phosphate such as tri-calcium phosphate ($Ca_3(PO_4)_2$), tri-magnesium phosphate $$(Mg_3(PO_4)_2)$$

ferric phosphate ($FePO_4$) or aluminium phosphate ($AlPO_4$) or the like by mixing said by-product gypsum with at least one of said additive substances. When the resulting mixture are heated at a suitable temperature, said by-product gypsum can be converted into at least one substance selected from the group consisting of half-hydrated gypsum, soluble anhydrous gypsum and a mixture thereof, and simultaneously, both phosphoric acid of solid solution state and water soluble phosphoric acid contained in the by-product gypsum are prevented from being converted into pyrophosphate or metaphosphate while almost all of them are converted into an inert phosphate. Then, the heat treated mixture can be converted into the dihydrated gypsum by subjecting it to hydration in the presence of water or a water slurry containing at least one said additive substances.

It should be understood that this invention can also be carried out in various modified ways. In one case, said additive substances to be admixed with the by-product gypsum may be divided into two parts, that is, the first part of said additive substances can be added to said by-product gypsum in an amount of slightly in excess of an amount required for conversion of water soluble phosphoric acid contained in said by-product gypsum into the inert phosphate. Then, the mixture is heated at a suitable temperature and converted to at least one substance selected from the group consisting of half-hydrated gypsum, soluble anhydrous gypsum and a mixture thereof. Then, the remaining second part of said additive substances is added to said heat-treated mixture and then the resulting mixture is subjected to hydration in the presence of water to form dihydrated gypsum and simultaneously solid state phosphoric acid contained in the by-product gypsum is converted into the inert phosphate.

In such case, said additive substances are used in an amount of from 1 to 10 times, preferably from 2 to 6 times of amount theoretically required for conversion of total phosphoric acid contained in the by-product gypsum into the inert phosphate.

When said additive substances are used in an amount of three or more times of amount theoretically required, the hydration can be well carried out by adding only water without further addition of said additive substances.

When Portland cement, powder produced from Portland cement clinker, flue dust produced from cement kiln, or pulverized slug produced from blast furnace is used as the additive substance, calcium component contained therein serves as a helpful component for the formation of the inert phosphate. Also the inventor has found that it is effective to convert total phosphoric acid contained in the by-product gypsum into the inert phosphate when one of said additive substances used in this invention is added to the by-product gypsum together with one or more basic substances such as caustic soda and ammonium or weak basic salts such as sodium carbonate and also that said conversion is effected when the hydration is carried out in the presence of one of said basic substances or said weak basic salts.

According to this invention, said mixture composed of the by-product gypsum and the additive substance or substances may preferably be calcined under normal pressure or heated with steam under pressure. When the steam is used, there is no necessity of evaporating water adhered to or combined with the by-product gypsum. In such case, therefore, heat consumption is remarkably decreased than that required when said mixture is calcined, and also said mixture can be treated continuously in the state of slurry.

It is necessary to heat the by-product gypsum at a temperature higher than a temperature at which the by-product gypsum can be converted into half-hydrated gypsum and soluble anhydrous gypsum. It is preferable to effect the heating at a temperature of from 120 to 300° C. in case said mixture is calcined and it is preferable to effect the heating at a temperature of from 120 to 200° C. in case said mixture is heated with steam under pressure. The by-product gypsum is heated, with the higher the heating temperature the shorter the heating time. Generally, it can be well done by heating said mixture for one hour at 200° C. in case said mixture is calcined and it is sufficient to heat for about 50 minutes at 150° C. in case said mixture is heated with steam under pressure.

In accordance with this invention, since water soluble phosphoric acid adhered to the by-product gypsum can be converted into the inert phosphate by action of the additive substance, it is not particularly necessary to wash completely the by-product gypsum with water before it is used.

This invention is illustrated by the following examples. The numerical value of the chemical analysis of the by-product gypsum and natural gypsum used in these examples are illustrated in Table IV. Parts given are by weight.

TABLE IV

| Kind of gypsum | Ignition loss, percent | CaO, percent | $SO_3$, percent | Fluorine, percent | Total phosphoric acid as $P_2O_5$, percent | Water soluble phosphoric acid as $P_2O_5$, percent |
| --- | --- | --- | --- | --- | --- | --- |
| By-product gypsum: | | | | | | |
| #1 | 22.50 | 31.36 | 42.40 | 1.63 | 1.18 | 0.98 |
| #2 | 21.29 | 31.72 | 43.19 | 0.86 | 0.65 | 0.60 |
| #3 | 21.35 | 31.46 | 43.10 | 0.89 | 0.79 | 0.19 |
| Natural gypsum | 22.76 | 27.90 | 34.05 | 0 | 0 | 9 |

*Example 1*

100 parts of the by-product gypsum as shown in #1 or #2 of the Table IV was mixed with 2 parts of calcium oxide. The mixture was subjected to calcination for one hour at a temperature of 200° C. to produce a mixture of half-hydrated gypsum and soluble anhydrous gypsum and then the resulting mixture was hydrated into dihydrated gypsum during a suitable period of time in a medium of the milk of lime containing 3 parts of calcium oxide (pulp density is 14%). The dihydrated gypsum thus obtained contained water soluble phosphoric acid in trace (calculated as $P_2O_5$) and 41.2% of $SO_3$.

*Example 2*

100 parts of the by-product gypsum shown in #1 or #2 of the Table IV was mixed with 6 parts of calcium oxide. The mixture was subjected to calcination for one hour at a temperature of 200° C. to produce a mixture of half-hydrated gysum and soluble anhydrous gypsum and then the resulting mixture thus obtained was hydrated to dihydrated gypsum by adding 19 parts of water during a suitable period of time. The dihydrated gypsum thus obtained contained water soluble phosphoric acid in trace (calculated as $P_2O_5$) and 41.0% of $SO_3$.

*Example 3*

100 parts of the by-product gypsum shown in #1 or #2 of the Table IV was mixed with 5 parts of calcium oxide. The mixture was subjected to calcination for one hour at a temperature of 200° C. to produce a mixture of half-hydrated gypsum and soluble anhydrous gypsum and then the resulting mixture was hydrated to dihydrated gypsum in the presence of 20 parts of sodium hydroxide solution having a concentration of 1%. The dihydrated gypsum thus obtained contained water soluble phosphoric acid in trace (calculated as $P_2O_5$) and 41.3% of $SO_3$.

*Example 4*

100 parts of the by-product gypsum shown in #1 or #2 of the Table IV was mixed with 20 parts of a powder (remaining part sieved with 0.088 mm. mesh is 5.2% by weight, specific surface area is 3240 in cm.²/g.) produced from the ordinary Portland cement clinker. The mixture was subjected to calcination of half an hour at a temperature of 250° C. to produce a mixture of half-hydrated gypsum and soluble anhydrous gypsum and then the resulting mixture was hydrated to dihydrated gypsum by adding 21 parts of water during a suitable period of time. The dihydrated gypsum thus obtained contained water soluble phosphoric acid in trace (calculated as $P_2O_5$) and 36.4% of $SO_3$.

*Example 5*

100 parts of the by-product gypsum shown in #3 of the Table IV was mixed with 5 parts of calcium hydroxide and 50 parts of sodium hydroxide solution having a concentration of 0.6%. The mixture was heated with steam at a temperature of 150° C. for 45 minutes in an autoclave under a pressure of about 4 atmospheres to produce half-hydrated gypsum, followed by lowering the heating temperature and then the resulting mixture was hydrated to dihydrated gypsum during a suitable period of time. The dihydrated gypsum thus obtained contained water soluble phosphoric acid in trace (calculated as $P_2O_5$) and 41.8% of $SO_3$.

*Example 6*

100 parts of the by-product gypsum shown in #3 of the Table IV was mixed with 5 parts of calcium hydroxide and 50 parts of water. The mixture was heated with steam at a temperature of 150° C. for 78 minutes in an autoclave under a pressure of about 4 atmospheres to produce half-hydrated gypsum, followed by lowering the heating temperature and then the resulting mixture was hydrated to dihydrated gypsum for a suitable period of time. The dihydrated gypsum thus obtained contained water soluble phosphoric acid in trace (calculated as $P_2O_5$) and 41.9% of $SO_3$.

*Example 7*

100 parts of the by-product gypsum shown in #3 of the Table IV was mixed with 6 parts of ferric hydroxide and the mixture was heated with steam at a temperature of 160° C. for 1.5 hours in an autoclave under pressure to produce a mixture of half-hydrated gypsum and soluble anhydrous gypsum and then the resulting heated product was hydrated to dihydrated gypsum for a suitable period of time in the presence of a milk of lime (pulp density is 10%) containing 2 parts of calcium oxide. The dihydrated gypsum thus obtained contained water soluble phosphoric acid in trace (calculated as $P_2O_5$) and 40.6% of $SO_3$.

Cements used for test were manufactured by mixing 3% by weight of the dihydrated gypsum obtained in the above examples with conventional Portland cement clinker and by crushing the mixture by a tube mill. The cements were tested by the method defined under Japan Industrial Standards. The results of the tests were illustrated in the following Table V. The Table V also includes Nos. 12, 13 and 14 as the comparative test. Each of the cement used for the comparative tests No. 12 and and No. 13 was prepared by crushing the mixture of the abovementioned Portland cement clinker with dihydrated gypsum which is produced by calcining the by-product gypsum shown in #1 and #2 of the Table IV, at a temperature of 200° C., mixing 100 parts of said calcined by-product gypsum with a milk of lime (pulp density is 50%) containing 6 parts of calcium oxide and subjecting thus produced mixture to hydration to form dihydrated gypsum. Said cements were also tested by the same method as mentioned above. The cement used for the comparative test 14 was prepared by crushing the mixture of the above mentioned Portland cement clinker with natural gypsum. Said cement was also tested by the same test as mentioned above.

TABLE V

| Test No. | Gypsum used | Cement used for test | | Setting test (Japan Industrial Standards) | | | | |
|---|---|---|---|---|---|---|---|---|
| | | $SO_3$ | Specific surface area, cm.$^2$/g. | Water content, percent | Initial setting time in minutes | Final setting time in minutes | Room temp. (° C.) | Humidity, percent |
| 1 | Product of Example 1 | 1.6 | 3,300 | 25.0 | 185 | 250 | 21 | 88 |
| 2 | ----do---- | 1.6 | 3,320 | 25.0 | 180 | 245 | 21 | 88 |
| 3 | Product of Example 2 | 1.6 | 3,310 | 25.0 | 205 | 270 | 21 | 88 |
| 4 | ----do---- | 1.6 | 3,320 | 25.0 | 210 | 270 | 21 | 88 |
| 5 | Product of Example 3 | 1.6 | 3,330 | 25.1 | 198 | 255 | 21 | 88 |
| 6 | ----do---- | 1.6 | 3,310 | 25.0 | 187 | 250 | 21 | 88 |
| 7 | Product of Example 4 | 1.6 | 3,290 | 24.7 | 202 | 264 | 21 | 88 |
| 8 | ----do---- | 1.6 | 3,300 | 25.0 | 199 | 261 | 21 | 88 |
| 9 | Product of Example 5 | 1.28 | 3,310 | 25.3 | 196 | 249 | 21 | 88 |
| 10 | Product of Example 6 | 1.37 | 3,240 | 24.8 | 188 | 236 | 21 | 88 |
| 11 | Product of Example 7 | 1.4 | 3,250 | 25.1 | 217 | 276 | 21 | 88 |
| 12 | Product of Comparative Example | 1.6 | 3,210 | 25.0 | 270 | 375 | 21 | 88 |
| 13 | ----do---- | 1.6 | 3,200 | 25.5 | 215 | 290 | 21 | 88 |
| 14 | Natural gypsum | 1.6 | 3,300 | 25.0 | 175 | 240 | 21 | 88 |

As apparent from the Table V, it is possible to economically produce the cements having grades equal to or even better than those of other cements produced by using natural gypsum when the by-product gypsum treated by the method of this invention is used as the inhibitor for the cement setting. The by-product gypsum treated by the method of this invention may be used together with natural gypsum.

While some examples of this invention have been illustrated and described above in detail, it is to be particularly understood that this invention is not limited thereto or thereby.

What I claim is:

1. A method of improving the grade of by-product gypsum obtained by a wet process for manufacturing phosphoric acid and containing free phosphoric acid, which comprises the steps of forming a mixture of said by-product gypsum, at least one additive substance selected from the group consisting of calcium oxide, calcium hydroxide, calcium carbonate, magnesium hydroxide, magnesium carbonate, powder produced from Portland cement clinker, Portland cement, flue dust produced from cement kiln operation, pulverized slag produced from blast furnace operation, iron hydroxide, iron oxide, aluminum hydroxide and aluminum oxide in the amount of from 2 to 6 times the amount theoretically required to neutralize and convert the total phosphoric acid contained in the by-product gypsum into inert phosphates, and at least one basic substance selected from the group consisting of caustic alkali, ammonia and sodium carbonate, subjecting said mixture to heating with steam under pressure at a temperature of from 120 to 200° C., thereby to form one substance selected from the group consisting of half-hydrated gypsum, anhydrous gypsum and mixtures thereof, and subjecting said substance thus produced to hydration in the presence of water thereby to form dihydrated gypsum containing said at least one additive substance.

2. A method of improving the grade of by-product gypsum obtained by a wet process for manufacturing phosphoric acid and containing free phosphoric acid, which comprises the steps of forming a mixture of said by-product gypsum and at least one additive substance selected from the group consisting of calcium oxide, calcium hydroxide, calcium carbonate, magnesium hydroxide, magnesium carbonate, powder produced from Portland cement clinker, Portland cement, flue dust produced from cement kiln operation, pulverized slag produced from blast furnace operation, iron hydroxide, iron oxide, aluminum hydroxide and aluminum oxide in the amount of from 3 to 6 times the amount theoretically required to neutralize and convert the total phosphoric acid contained in the by-product gypsum into inert phosphates, subjecting said mixture to calcining at a temperature of from 120 to 300° C., thereby to form one substance selected from the group consisting of half-hydrated gypsum, anhydrous gypsum and mixtures thereof, and subjecting said substance thus obtained to hydration in the presence of water containing at least one basic substance selected from the group consisting of caustic alkali, ammonia and sodium carbonate, thereby to form dihydrated gypsum containing said at least one additive substance.

3. A method of improving the grade of by-product gypsum obtained by a wet process for manufacturing phosphoric acid and containing free phosphoric acid, which comprises the steps of forming a mixture of said by-product gypsum, at least one additive substance selected from the group consisting of calcium oxide, calcium hydroxide, calcium carbonate, magnesium hydroxide, magnesium carbonate, powder produced from Portland cement clinker, Portland cement, flue dust produced from cement kiln operation, pulverized slag produced from blast furnace operation, iron hydroxide, iron oxide, aluminum hydroxide and aluminum oxide in an amount slightly in excess of the amount theoretically required to neutralize and convert the water-soluble phosphoric acid contained in the by-product gypsum into inert phosphates, and at least one basic substance selected from the group consisting of caustic alkali, ammonia and sodium carbonate, subjecting said mixture to steam heating under pressure at a temperature of from 120 to 200° C., thereby to form one substance selected from the group consisting of half-hydrated gypsum, anhydrous gypsum and mixtures thereof, and subjecting said substance thus produced to hydration in the presence of a water slurry containing at least one of said additive substances in an amount such that until the total amount of said additive substances is 2 to 10 times the amount theoretically required to neutralize and convert the total phosphoric acid contained in the by-product gypsum into inert phosphates, thereby to form dihydrated gypsum containing said at least one substance.

4. A method of improving the grade of by-product gypsum obtained by a wet process for manufacturing phosphoric acid and containing free phosphoric acid, which comprises the steps of forming a mixture of said by-product gypsum and at least one additive substance selected from the group consisting of calcium oxide, calcium hydroxide, calcium carbonate, magnesium hydroxide, magnesium carbonate, powder produced from Portland cement clinker, Portland cement, flue dust produced from cement kiln operation, pulverized slag produced from blast furnace operation, iron hydroxide, iron oxide, aluminum hydroxide and aluminum oxide in an amount slightly in excess of the amount theoretically required to neutralize and convert the water-soluble phosphoric acid contained in the by-product gypsum into inert phosphates, subjecting said mixture to calcining at a temperature of from 120 to 300° C., thereby to form one substance selected from the group consisting of half-hydrated gypsum, anhydrous gypsum and mixtures thereof, and subjecting the substance thus produced to hydration in the presence of a water slurry containing at least one of said additive substances in an amount such that the total amount of said additive substances is 2 to 10 times the amount theoretically required to neutralize and convert the total phosphoric acid contained in the by-product gypsum into inert phosphates, and at least one basic substance selected from the group consisting of caustic alkali, ammonia and sodium carbonate, thereby to form dihydrated gypsum containing said at least one additive substance.

5. A method of improving the grade of by-product gypsum obtained by a wet process for manufacturing phosphoric acid and containing free phosphoric acid, which comprises the steps of forming a mixture of said by-product gypsum and at least one additive substance selected from the group consisting of calcium oxide, calcium hydroxide, calcium carbonate, magnesium hydroxide, magnesium carbonate, powder produced from Portland cement clinker, Portland cement, flue dust produced from cement kiln operation, pulverized slag produced from blast furnace operation, iron hydroxide, iron oxide, aluminum hydroxide and aluminum oxide in an amount of from 2 to 6 times the amount theoretically required to neutralize and convert the total phosphoric acid contained in the by-product gypsum into inert phosphates, one of said by-product gypsum and said additive substance being in the form of a water slurry, subjecting said mixture to heating with steam under pressure at a temperature of from 120 to 200° C., thereby to form one substance selected from the group consisting of half-hydrated, gypsum, anhydrous gypsum and mixtures thereof, and subjecting the substance thus produced to hydration by allowing it to cool by standing, thereby to form hydrated gypsum containing said at least one additive substance.

6. A method of improving the grade of by-product gypsum obtained by a wet process for manufacturing phosphoric acid and containing free phosphoric acid, which comprises the steps of forming a mixture of said by-product gypsum and at least one additive substance selected from the group consisting of calcium oxide, calcium hydroxide, calcium carbonate, magnesium hydroxide, magnesium carbonate, powder produced from Portland cement clinker, Portland cement, flue dust produced from cement kiln operation, pulverized slag produced from blast furnace operation, iron hydroxide, iron oxide, aluminum hydroxide and aluminum oxide in an amount slightly in excess of the amount theoretically required to neutralize and convert the water-soluble phosphoric acid contained in the by-product gypsum into inert phosphates, one of said by-product gypsum and said additive substance being in the form of a water slurry, subjecting said mixture to heating with steam under pressure at a temperature of from 120 to 200° C., thereby to form one substance selected from the group consisting of half-hydrated gypsum, anhydrous gypsum and mixtures thereof and subjecting the substance thus produced to hydration in the presence of a water slurry containing at least one of said additive substances in an amount such that the total amount of said additive substances is 2 to 10 times the amount theoretically required to neutralize and convert the total phosphoric acid contained in the by-product gypsum into inert phosphates, thereby to form dihydrated gypsum containing said at least one additive substance.

7. A method of improving the grade of by-product gypsum obtained by a wet process for manufacturing phosphoric acid and containing free phosphoric acid, which comprises the steps of forming a mixture of said by-product gypsum and at least one additive substance selected from the group consisting of calcium oxide, calcium hydroxide, calcium carbonate, magnesium hydroxide, magnesium carbonate, powder produced from Portland cement clinker, Portland cement, flue dust produced from cement kiln operation, pulverized slag produced from blast furnace operation, iron hydroxide, iron oxide, aluminum hydroxide and aluminum oxide in the amount of from 3 to 6 times the amount theoretically required to neutralize and convert the total phosphoric acid contained in the by-product gypsum into inert phosphorates, subjecting said mixture to calcining at a temperature of from 120 to 300° C., thereby to form one substance selected from the group consisting of half-hydrated gypsum, anhydrous gypsum and mixtures thereof, and subjecting the substance thus produced to hydration in the presence of water thereby to form dihydrated gypsum containing said at least one additive substance.

8. A method of improving the grade of by-product gypsum obtained by a wet process for manufacturing phosphoric acid and containing free phosphoric acid, which comprises the steps of forming a mixture of said by-product gypsum and at least one additive substance selected from the group consisting of calcium oxide, calcium hydroxide, calcium carbonate, magnesium hydroxide, magnesium carbonate, powder produced from Portland cement clinker, Portland cement, flue dust produced from cement kiln operation, pulverized slag produced from blast furnace operation, iron hydroxide, iron oxide, aluminum hydroxide and aluminum oxide, in an amount slightly in excess of the amount theoretically required to neutralize and convert the water-soluble phosphoric acid contained in the by-product gypsum into inert phosphates, subjecting said mixture to calcining at a temperature of from 120 to 300° C., thereby to form one substance selected from the group consisting of half-hydrated gypsum, anhydrous gypsum and mixtures thereof, and subjecting the substance thus produced to hydration in the presence of a water slurry containing at least one of said additive substances in an amount such that the total amount of said additive substances is 2 to 10 times the amount theoretically required to neutralize and convert the total phosphoric acid contained in the by-product gypsum into inert phosphates, thereby to form dihydrated gypsum containing said at least one additive substance.

9. A method of improving the grade of by-product gypsum obtained by a wet process for manufacturing phosphoric acid and containing free phosphoric acid, which comprises the steps of forming a mixture of said by-product gypsum and at least one additive substance selected from the group consisting of calcium oxide, calcium hydroxide, calcium carbonate, magnesium hydroxide, magnesium carbonate, powder produced from Portland cement clinker, Portland cement, flue dust produced from cement kiln operation, pulverized slag produced from blast furnace operation, iron hydroxide, iron oxide, aluminum hydroxide and aluminum oxide in an amount of from 2 to 6 times the amount theoretically required to neutralize and convert the total phosphoric acid contained in the by-product gypsum into inert phosphates, subjecting said mixture to heating with steam under pressure at a temperature of from 120 to 200° C., thereby to form one substance selected from the group consisting of half-hydrated gypsum, anhydrous gypsum and mixtures thereof, and subjecting the substance thus produced to hydration in the presence of water thereby to form dihydrated gypsum containing said at least one additive substance.

10. A method of improving the grade of by-product gypsum obtained by a wet process for manufacturing phosphoric acid and containing free phosphoric acid, which comprises the steps of forming a mixture of said by-product gypsum and at least one additive substance selected from the group consisting of calcium oxide, calcium hydroxide, calcium carbonate, magnesium hydroxide, magnesium carbonate, powder produced from Portland cement clinker, Portland cement, flue dust produced from cement kiln operation, pulverized slag produced from blast furnace operation, iron hydroxide, iron oxide, aluminum hydroxide and aluminum oxide in an amount slightly in excess of the amount theoretically required to neutralize and convert the water-soluble phosphoric acid contained in the by-product gypsum into inert phosphates, subjecting said mixture to heating with steam under pressure at a temperature of from 120 to 200° C., thereby to form one substance selected from the group consisting of half-hydrated gypsum, anhydrous gypsum and mixtures thereof, and subjecting the substance thus produced to hydration in the presence of a water slurry containing at least one of said additive substances in an amount such that a total amount of said additive substances is 2 to 10 times the amount theoretically required to neutralize and convert the total phosphoric acid contained in the by-product gypsum into inert phosphates, thereby to form dihydrated gypsum containing said at least one additive substance.

References Cited in the file of this patent

UNITED STATES PATENTS

| | | |
|---|---|---|
| 1,713,868 | Edwards | May 21, 1929 |
| 1,900,381 | Hansen | Mar. 7, 1933 |
| 1,969,449 | Bryan | Aug. 7, 1934 |
| 1,997,782 | Windecker | Apr. 16, 1935 |
| 2,959,466 | Reimers | Nov. 8, 1960 |
| 3,004,827 | Schaus | Oct. 17, 1961 |